Oct. 1, 1957 J. C. WEBB 2,807,887
MEASURING TAPE LEVEL INDICATING DEVICE
Filed March 22, 1955
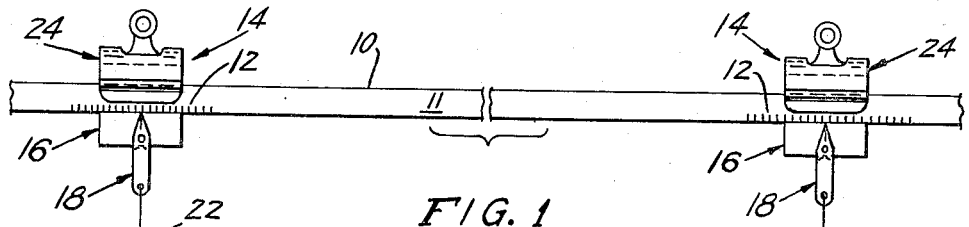
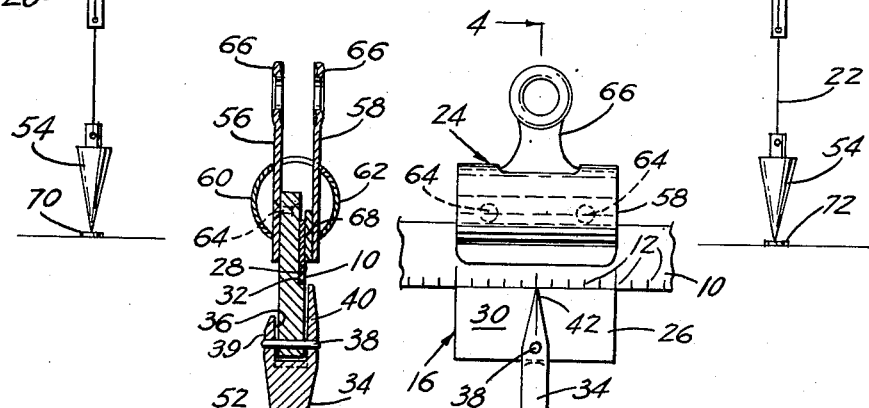
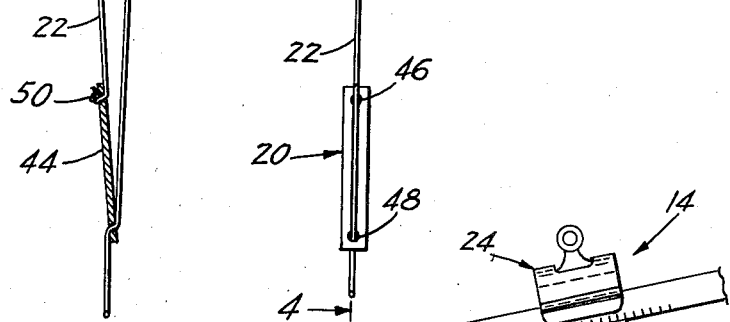
INVENTOR.
JAMES C. WEBB
BY
McMorrow, Berman + Davidson
ATTORNEYS

United States Patent Office 2,807,887
Patented Oct. 1, 1957

2,807,887

MEASURING TAPE LEVEL INDICATING DEVICE

James C. Webb, New Milford, Ohio

Application March 22, 1955, Serial No. 495,879

6 Claims. (Cl. 33—207)

This invention relates to flexible measuring rules, and more particularly to a level indicating and measuring device to be used with such rules.

Many times when chaining with flexible measuring tapes and plumb bobs, the tape is not horizontal with the surface to be measured. Since in accuracy of measurement, it is essential that the tape be truly horizontal, it is the principal object of this invention to provide a level and measuring device readily attachable upon the tape to indicate the true horizontal position of the tape and to show the amount of deviation from the horizontal.

In some instances, large errors are committed in chaining with a flexible measuring tape and plumb bobs depending therefrom on strings due to the string moving off the foot or fraction mark on the tape. Hence, it is a further object of the device of this invention to provide means whereby the possibility of the plumb bob moving off the indicated mark is obviated. Also, the device frees one hand of the operator to steady the plumb bob line or to apply more tension to the tape.

Yet another object of this invention is to provide a level device which may be used to accurately indicate and maintain a desired linear distance on a flexible measuring tape.

Other objects and advantages will become apparent from a consideration of the following detailed description, forming the specification, and taken in conjunction with the accompanying drawing, in which:

Figure 1 is a front elevational view of a portion of a flexible measuring tape, broken away intermediate its ends, with the device embodying this invention secured thereon;

Figure 2 is a view similar to Figure 1 but shows the tape inclined from the horizontal position of Figure 1;

Figure 3 is an enlarged front elevational view of one of the level and measuring devices secured to a tape shown fragmentarily; and, Figure 4 is a vertical cross sectional view taken along line 4—4 of Figure 3.

With continued reference to the drawing, there is shown a flexible measuring tape 10 of steel having linear distance indicia 12 on one face thereof adjacent one longitudinal edge. The tape 10 is of the type normally employed in surveying for chaining or measuring distances between known points.

The tape level and distance indicating device of this invention is generally indicated at 14, there being two devices 14 normally employed in connection with a tape.

The device 14 generally comprises an upstanding body 16, an indicator 18 carried by the body for movement in an arcuate path about a horizontal axis adjacent the lower end of the body, a slide 20 carried on a flexible line 22 depending from the indicator 18 for adjusting the length of the line, and a clip 24 carried by the body adjacent the upper end thereof to provide means whereby the device is detachably secured to the tape 10.

The body 16 is in the form of a metal plate 26 of generally square shape. A groove 28 is cut transversely across one face 30 of the plate and opens to the top and opposite sides thereof to define a transversely extending ledge 32 intermediate the top and bottom ends of the body and parallel to the top and bottom edges of the body. As clearly seen in Figure 4, the lower edge of the tape 10 rests upon the ledge 32 with its face 11 bearing the indicia 12 facing outwardly.

The indicator 18 takes the form of a metal arm 34 having a body receiving slot 36 therein opening to opposite sides and the top thereof in which the lower portion of the body is disposed. A pin 38 extends transversely through the arm adjacent its upper end and through a suitably formed registering hole in the plate 26. The lower edge of the plate is spaced from the bottom of the slot 36 to permit movement of the arm 34 in an arcuate path about the axis of the pin 38 defining a longitudinal axis.

The slot 36 divides the upper end of the arm into a rear finger 39 and front finger 40 overlying the front face 30 of the plate and having a pointed free end 42 terminating adjacent the ledge 32 defining an indexing point with reference to the scale indicia on the tape.

The slide 20 is an elongated, rectangular plate 44 having holes 46 and 48 transversely therethrough adjacent opposite ends thereof. The flexible line 22, which may be string or cord, has one end 50 knotted. The line is threaded through the hole 46 and lead upwardly to pass through an opening 52 extending transversely through arm 34 adjacent the end thereof remote from the slot 36. The line is then lead downwardly and threaded through the hole 48. A plumb bob 54 is secured to the other end of the line 22, as shown in Figure 1.

The clip 24 is of spring metal having a pair of spaced, generally rectangular jaws 56 and 58 resiliently urged toward each other by the arcuately bowed spring members 60 and 62 operatively associated with respective jaws 56 and 58. The jaw 56 is secured to the plate 26 adjacent the upper end thereof by rivets 64 so as to be carried by the body 16. Each of the jaws is provided with an upstanding thumb grip 66 providing handles whereby the jaw 58 can be moved away from the jaw 56 against the yielding effort of the respective spring members 60 and 62.

A brake 68, in the form of a strip of friction material such as leather, is secured, as by an adhesive, to the inner face of the jaw 58. The brake extends transversely across the jaw with its lower edge coterminous with the lower edge of the jaw 58, as seen in Figure 4. The brake frictionally engages the front or outer face 11 of the tape 10 to prevent displacement of the device 14 relative to the tape.

In use, a pair of the devices 14 are clamped upon the tape 10, in the manner hereinbefore described, so that the plumb bobs 54 are directly over the markers 70 and 72 indicating the points between which a measurement is to be taken. The tape 10 will be raised or lowered to bring the indexing point 42 of the indicator arm into registry with a mark of the indicia on the tape and in a position where the arm 34 is perpendicular to the longitudinal edge of the tape. Thus, if the tape is canted, as in Figure 2, the indicator will be disposed obliquely with respect to the longitudinal axis of the tape. The ends of the tape will be raised or lowered to bring the indexing point into perpendicular relation to the tape, as in Figure 1. This will insure an accurate horizontal reading. Also, the distance between the indexing marks on the two devices can be read off the tape to quickly determine the distance between the markers.

It is also possible to set the devices 14 at a given distance apart and mark this distance on a true horizontal reading by maintaining the tape in a horizontal position.

Since the devices 14 will be securely clamped onto the tape with the brake 68 frictionally engaging the tape to prevent movement along the tape from the desired location thereon, one hand of the operator will be freed to steady the freely swingable plumb bob to insure its disposition immediately over a marker. Or, the operator can readily release the clip and move it along the tape to a location where the plumb bob will be directly over a marker when the tape is in a true horizontal position. Thus, great accuracy of measurement is achieved.

While there is shown the described the preferred embodiment of the invention, it is to be understood that the structure is susceptible to change and modification within the practicability of the invention and therefore should be limited only by the scope of the claims appended hereto.

What is claimed is:

1. In combination with a flexible measuring tape having scaled indicia on one face thereof; a level indicating device comprising a body including a plate having a ledge transversely across one face and intermediate the ends thereof to provide a support for one edge of the tape, clamp means carried by said body for releasably securing said device on said tape at a selected location therealong, a weighted level indicator carried by said body for free movement in an arcuate path about an axis adjacent one end of said body and perpendicular to the longitudinal axis of the tape, said indicator including a free pointed end defining an indexing pointer arranged below and adjacent said ledge to cooperate with the scaled indicia on the tape to show any deviation of the tape from a horizontally extending position.

2. In combination with a flexible measuring tape having scaled indicia on one face thereof; a level indicating device comprising a body including a plate having a ledge transversely across one face and intermediate the ends thereof to provide a support for one edge of the tape, clamp means carried by said body for releasably securing said device on said tape at a selected location therealong, a weighted level indicator carried by said body for free movement in an arcuate path about an axis adjacent one end of said body and perpendicular to the longitudinal axis of the tape, said indicator including a free pointed end defining an indexing pointer arranged below and adjacent said ledge to cooperate with the scaled indicia on the tape to show any deviation of the tape from a horizontally extending position, said clamping means comprising a clip having a pair of spaced jaws, one of said jaws secured to the face opposite said one face of the plate, the other of said jaws overlying said one face of the plate and arranged above said ledge to move toward said other jaw under yielding effort for clamping the tape against said one face of the plate.

3. In combination with a flexible measuring tape having scaled indicia on one face thereof; a level indicating device comprising a body including a plate having a ledge transversely across one face and intermediate the ends thereof to provide a support for one edge of the tape, clamp means carried by said body for releasably securing said device on said tape at a selected location therealong, a weighted level indicator carried by said body for free movement in an arcuate path about an axis adjacent one end of said body and perpendicular to the longitudinal axis of the tape, said indicator including a free pointed end defining an indexing pointer arranged below and adjacent said ledge to cooperate with the scaled indicia on the tape to show any deviation of the tape from a horizontally extending position, said clamping means comprising a clip having a pair of spaced jaws, one of said jaws secured to the face opposite said one face of the plate, the other of said jaws overlying said one face of the plate and arranged above said ledge to move toward said other jaw under yielding effort for clamping the tape against said one face of the plate, a friction brake carried by said other jaw engaging the tape to prevent displacement of the device along said tape.

4. In combination with a flexible measuring tape having scaled indicia on one face thereof; a level indicating device comprising a body including a plate having a ledge transversely across one face and intermediate the ends thereof to provide a support for one edge of the tape, clamp means carried by said body for releasably securing said device on said tape at a selected location therealong, a weighted level indicator carried by said body for free movement in an arcuate path about an axis adjacent one end of said body and perpendicular to the longitudinal axis of the tape, said indicator including a free pointed end defining an indexing pointer arranged below and adjacent said ledge to cooperate with the scaled indicia on the tape to show any deviation of the tape from a horizontally extending position, said indicator being in the form of an arm having a slot opening through opposite sides and the top thereof to receive one edge of the plate therein, front and rear fingers defining opposite sides of said slot, said front finger having said pointed end thereon.

5. In combination with a flexible measuring tape having scaled indicia on one face thereof; a level indicating device comprising a body including a plate having a ledge transversely across one face and intermediate the ends thereof to provide a support for one edge of the tape, clamp means carried by said body at one end thereof for releasably securing said device on said tape at a selected location therealong, a weighted level indicator carried by said body for free movement in an arcuate path about an axis adjacent the other end of said body and perpendicular to the longitudinal axis of the tape, said indicator including a free pointed end defining an indexing pointer arranged below and adjacent said ledge to cooperate with the scaled indicia on the tape from a horizontally extending position, said clamping means comprising a clip having a pair of spaced jaws, one of said jaws secured to the face opposite said one face of the plate, the other of said jaws overlying said one face of the plate and arranged above said ledge to move toward said other jaw under yielding effort for clamping the tape against said one face of the plate, said indicator being in the form of an arm having a slot opening through opposite sides and the top thereof to receive one edge of the plate therein, front and rear fingers defining opposite sides of said slot, said front finger having said pointed end thereon.

6. In combination with a flexible measuring tape having scaled indicia on one face thereof; a level indicating device comprising a body including a plate having a ledge transversely across one face and intermediate the ends thereof to provide a support for one edge of the tape, clamp means carried by said body at one end thereof for releasably securing said device on said tape at a selected location therealong, a weighted level indicator carried by said body for free movement in an arcuate path about an axis adjacent the other end of said body and perpendicular to the longitudinal axis of the tape, said indicator including a free pointed end defining an indexing pointer arranged below and adjacent said ledge to cooperate with the scaled indicia on the tape to show any deviation of the tape from a horizontally extending position, said clamping means comprising a clip having a pair of spaced jaws, one of said jaws secured to the face opposite said one face of the plate, the other of said jaws overlying said one face of the plate and arranged above said ledge to move toward said other jaw under yielding effort for clamping the tape against said one face of the plate, a friction brake carried by said other jaw engaging the tape to prevent displacement of the device along said tape, said indicator being in the form of an arm having a slot opening through opposite sides and the top thereof to receive one edge of the plate therein, front and rear fingers defining opposite sides of said slot, said front finger having said pointed end thereon.

References Cited in the file of this patent

UNITED STATES PATENTS

| 713,608 | Condlon | Nov. 18, 1902 |
| 1,080,448 | Honey | Dec. 2, 1913 |
| 1,705,871 | MacEachron | Mar. 19, 1929 |
| 2,624,118 | Anderson | Jan. 6, 1953 |